(12) United States Patent
Mouser et al.

(10) Patent No.: US 7,856,489 B2
(45) Date of Patent: Dec. 21, 2010

(54) SIMPLIFY SERVER REPLACEMENT

(75) Inventors: Richard L. Mouser, Houston, TX (US);
Joseph F. DeSimone, Jr., Worcester, MA (US); Michael P. Maley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 880 days.

(21) Appl. No.: 11/805,592

(22) Filed: May 24, 2007

(65) Prior Publication Data

US 2008/0294819 A1    Nov. 27, 2008

(51) Int. Cl.
*G06F 15/177* (2006.01)
(52) U.S. Cl. .................. 709/221; 709/212; 709/213; 709/219
(58) Field of Classification Search .......... 709/212, 709/213, 219, 221
See application file for complete search history.

(56) References Cited

U.S. PATENT DOCUMENTS

| | | | |
|---|---|---|---|
| 6,665,714 B1 * | 12/2003 | Blumenau et al. | 709/222 |
| 6,754,718 B1 * | 6/2004 | Dobberpuhl et al. | 709/250 |
| 7,669,000 B2 * | 2/2010 | Sharma et al. | 710/310 |
| 7,685,281 B1 * | 3/2010 | Saraiya et al. | 709/226 |
| 2001/0020254 A1 * | 9/2001 | Blumenau et al. | 709/229 |
| 2006/0136704 A1 | 6/2006 | Arendt et al. | |
| 2006/0173912 A1 | 8/2006 | Lindvall et al. | |
| 2010/0199037 A1 * | 8/2010 | Umbehocker et al. | 711/113 |

* cited by examiner

*Primary Examiner*—Michael Won

(57) ABSTRACT

There is provided techniques for automating attachment of a server to a storage area network (SAN). In accordance with one embodiment, a method is provided which includes storing identifiers in a memory associated with an enclosure adapted to house one or more servers. The identifiers are correlated to a particular location of the enclosure. Additionally, the method includes providing the identifiers from the memory to host bus adapters (HBAs) associated with a particular location when a server is placed in the particular location.

18 Claims, 5 Drawing Sheets

SIMPLIFY SERVER REPLACEMENT

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Data and information have emerged as some of the most important assets a company can possess in the modern economy. Indeed, the ability of a particular company to efficiently generate, process and use information and data may directly impact the company's productivity and competitiveness. Communications and computer technologies have been developed to more efficiently process, use and store data. In particular, Storage Area Networks (SANs) have been developed and deployed to increase the efficiency of data and information access and storage. A SAN is a physical collection of interconnected storage enclosures, switches and servers with host bus adapters (HBAs), typically, all interconnected using Fibre Channel. The SAN allows for one or several servers to share a common storage device or a network of many different storage devices. Users on a network, such as a local area network (LAN) can access the SAN via the servers.

Occasionally, however, it may be necessary or desirable to replace a server. When a replacement server is placed into the system it may be unable to attach to the SAN because a new WWID would be associated with the new server and the SAN would not recognize the new server. Conventionally, manual intervention was required at the server console and on the SAN to reconfigure the SAN controller and SAN switches to allow the new server to attach to the SAN.

DETAILED DESCRIPTION OF SPECIFIC EMBODIMENTS

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In accordance with the present techniques, a system and method are provided to automate storage area network (SAN) attachment or SAN booting of servers. To accomplish this, each bay or slot of an enclosure is assigned an identifier instead of the identifier being stored on each blade. The enclosure stores the identifiers for each bay and provides the assigned identifier to host bus adapters (HBA) when a server is placed in the bay. Thus, each HBA port for a particular bay may retain the same identifier even if a replacement server is placed in the bay.

Figure 1:
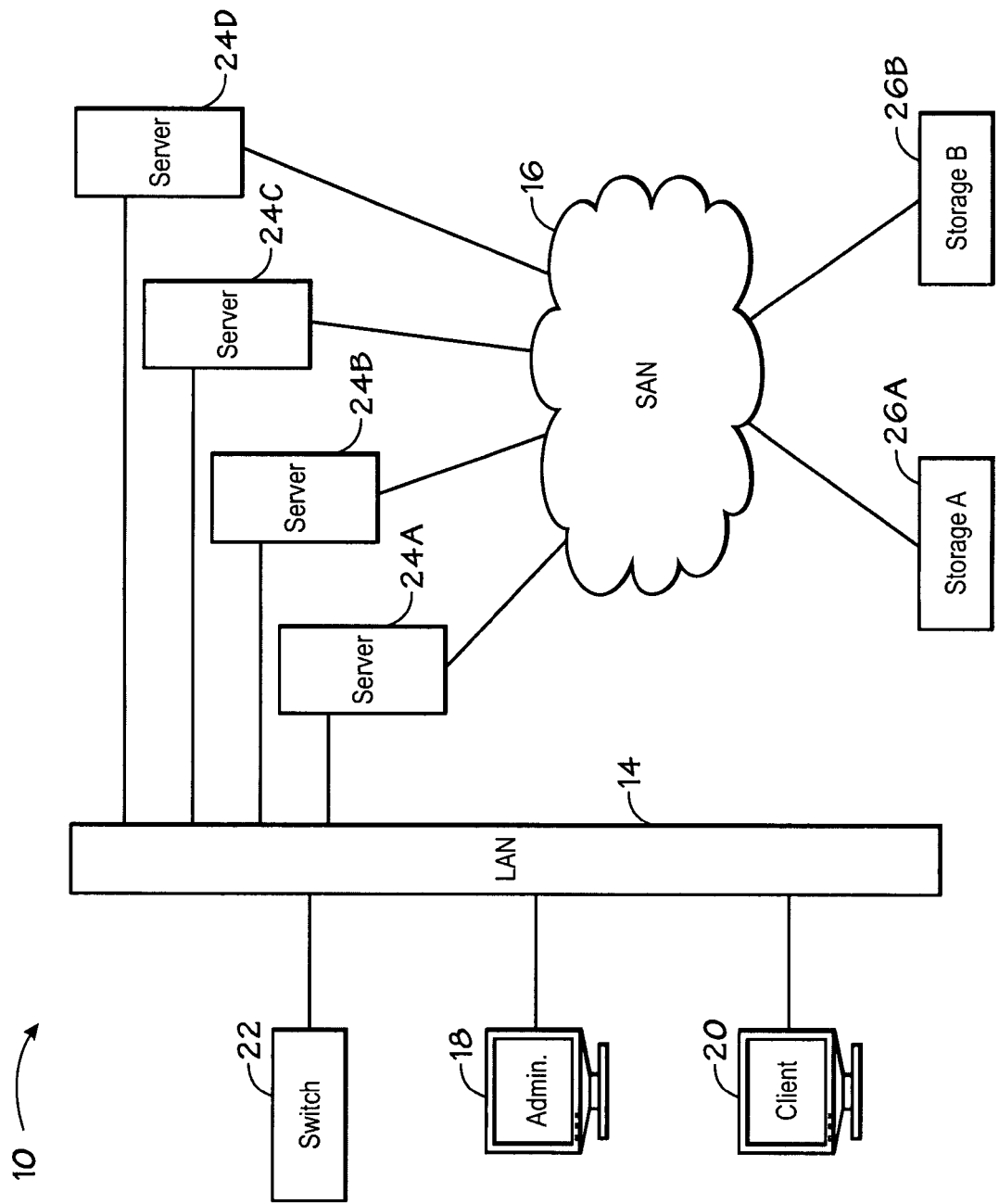
FIG. 1 illustrates a block diagram of a computer network having a local area network and a storage area network (SAN)

Turning to the figures and referring to FIG. 1, a block diagram of a computer network is illustrated in accordance with an exemplary embodiment of the present invention and is generally referred to by the reference numeral 10. The computer network 10 may include a local area network (LAN) 14 and a storage area network (SAN) 16. The LAN 14 may be implemented according to the IEEE 802.3 standard for Ethernet or any other appropriate configuration, protocol or standard. For example, the LAN 14 may include a network administrator terminal 18, client terminals 20, and a switch 22. The network administrator terminal 18 may be configured to allow a network administrator manage the LAN 14. Client terminals 20 may include one or more personal computers, notebook computers or other computing stations that allow a user to interface the LAN 14. The switch 22 controls traffic on the LAN 14.

In this example, servers 24A-D are coupled to the LAN 14 and configured to provide services to the client computers 20 across the LAN 14. For example, the servers 24A-D may be configured to operate as file servers, application servers, web servers, and/or email servers, among other things. The servers 24A-D are also coupled to the SAN 16 and allow the computers 20 to access the SAN 16. The servers 24A-D may be blade servers configured to be placed in an enclosure, as will be discussed in greater detail below.

The SAN 16 may be implemented in a Fibre Channel (FC) configuration or any other appropriate configuration. The FC configuration provides the advantages of high speed and wide spread interoperability, among other things. The SAN 16 includes switches that enable the servers 24A-D to access data and/or information stored in storage 26A-B. The storage 26A-B may be any type of storage medium, such as for example, tape, optical, disk, or semiconductor, etc. The SAN 16 may be housed within the same enclosure as the servers 24A-D.

Figure 2:
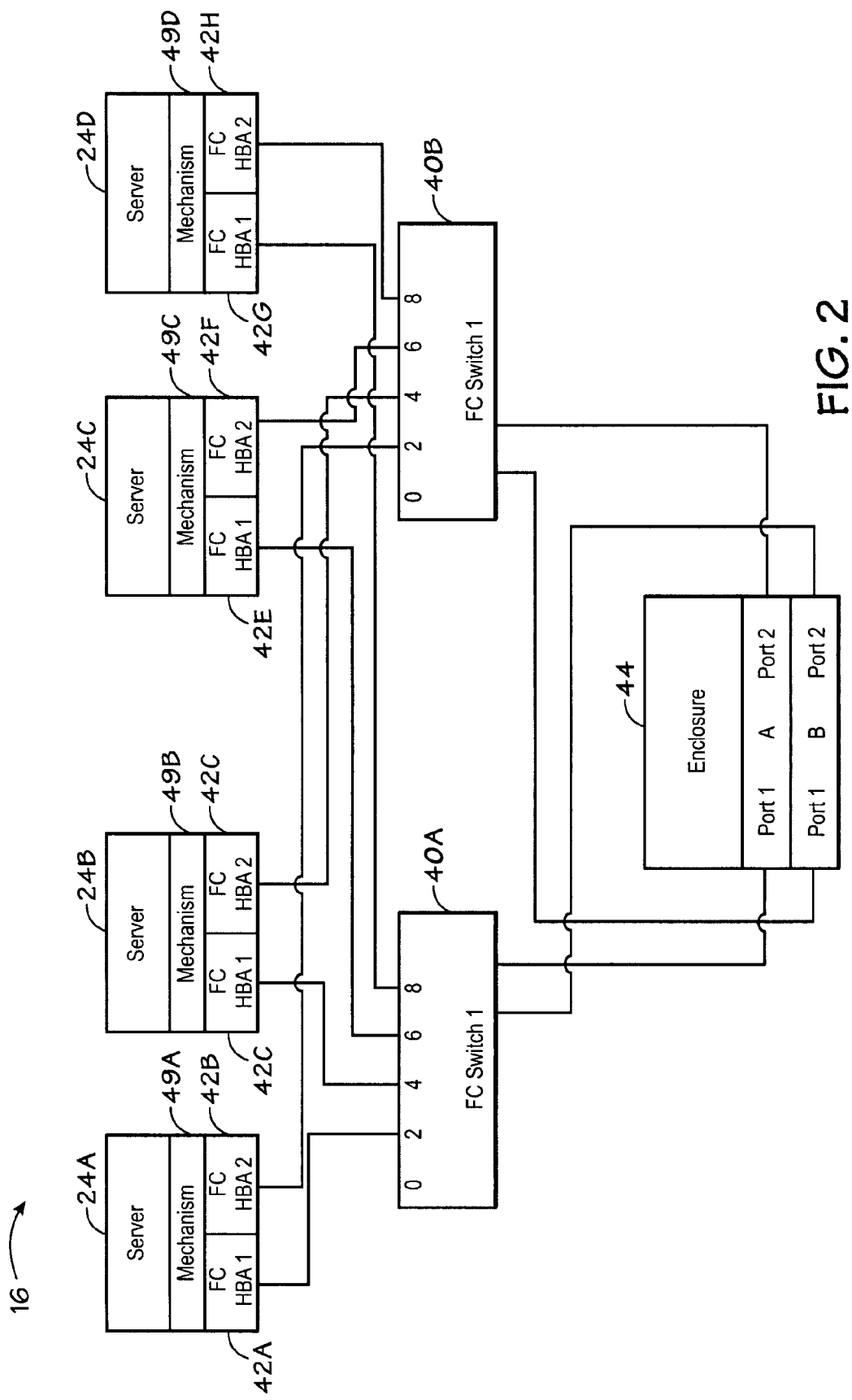
FIG. 2 illustrates the block diagram of the SAN of FIG. 1.

Turning to FIG. 2, a block diagram of the SAN 16 of FIG. 1 is illustrated. The SAN 16 includes fibre channel switches 40A-B. The fiber channel switches 40A-B are computer storage devices that provide a fiber channel fabric for the SAN 16. The switches 40A-B allow many-to-many communication between devices and provide device name lookup, security, and redundancy.

The fiber channel switches 40A-B are connected to the servers 24A-D through host bus adapters (HBAs) 42A-H. The HBAs 42A-G connect the servers 24A-D to the SAN 16. Each HBA 42A-G has a unique worldwide identifier (WWID) or world wide name (WWN), which is similar to an Ethernet MAC address, that is used by the SAN 16 to recognize the server 24A-D and properly route data to and from the server 24A-D. As can be seen, each server 24A-D may have multiple HBAs. For example, server 24A may have two HBAs 42A-B.

Figure 3:
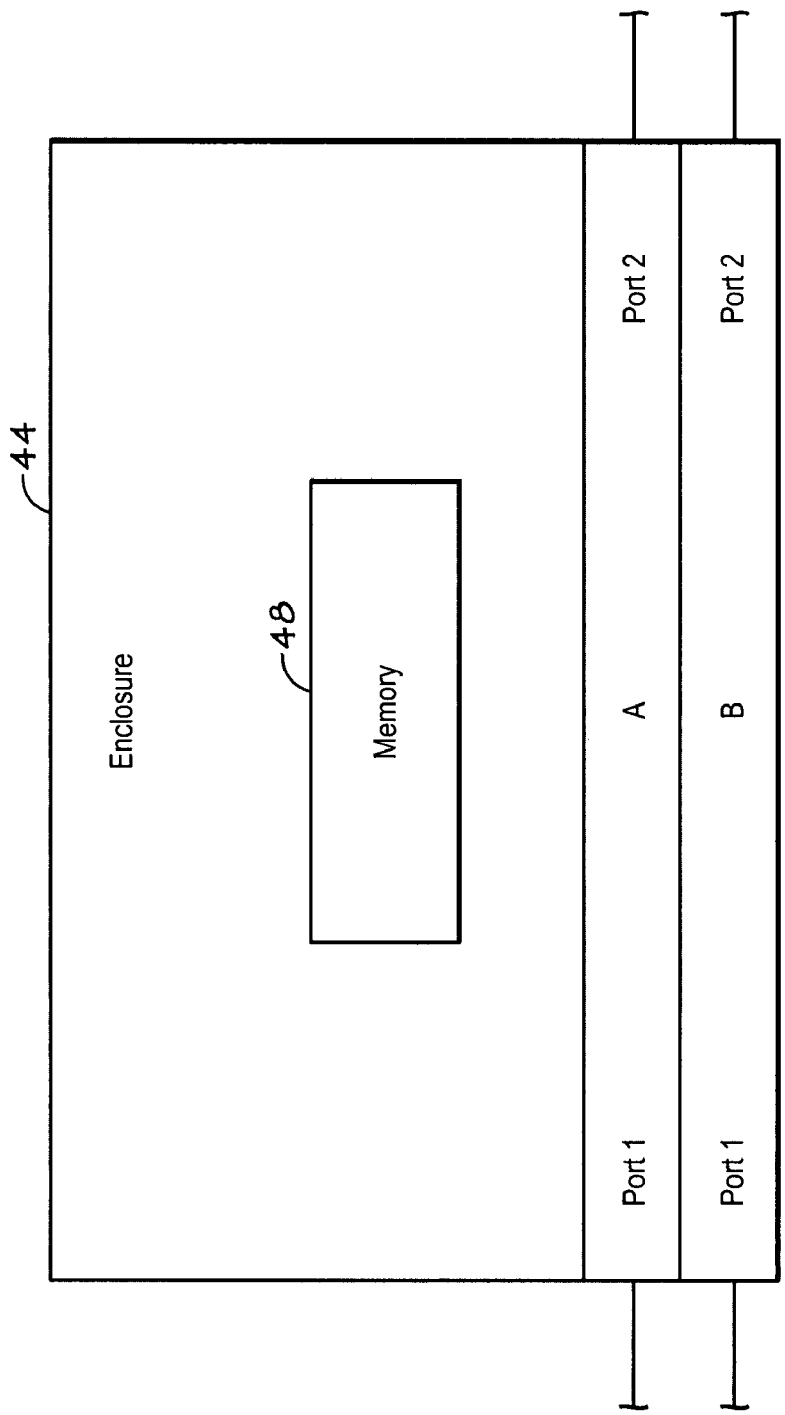
FIG. 3 illustrates the enclosure of FIG. 2 storing identifiers for the servers.

In this example, the SAN 16 is also housed within the enclosure 44. The enclosure 44 may have ports to which the switches 40A-B may be coupled. As shown in FIG. 3, a memory 48 of the enclosure 44 may store the identifiers, i.e., WWIDs or WWNs, for the HBAs 42A-H. The memory 48 of the enclosure 44 may be located on a back plane, a mid-plane memory, or any other appropriate location associated with the enclosure 44. The memory 48 may be read only memory (ROM), programmable read only memory (PROM), erasable and programmable read only memory (EPROM), Flash memory, electrically erasable and programmable read only memory (EEPROM), or non-volatile random access memory (NVRAM), for example. Each bay or slot of the enclosure 44 may be assigned one or more identifiers to be used with each server 24A-D that is placed in a particular bay or slot. With the identifiers stored on the memory 48 of enclosure 44, each time a server 24A-D is placed in a bay or slot, the assigned identifier stored in the memory 48 of the enclosure 44 is provided to the HBAs associated with the new server. If no identifiers are found on the memory 48 of the enclosure 44, then the HBAs are disabled and attachment to the SAN 16 fails.

The storing of the identifiers, such as the WWIDs or WWNs, on the memory 48 of the enclosure 44 increases the efficiency with which the servers space 24A-D are attached to the SAN 16 because no intervention by a user, administrator or technician is necessary for attachment of the server 24A-D to the SAN 16. This is because every server 24A-D placed in a particular bay is assigned the same identifier. Stated differently, a server 24A-D positioned into a bay can utilize the same identifier as a server previously occupying the bay and, therefore, replacement of a server in a particular bay does not alter the identifier for the bay and, thus, for the server associated with the particular bay.

In implementing a system that stores the identifiers on the memory 48 of the enclosure 44, a mechanism 49A-D may be provided to allow users to manage, i.e., read, write, and delete, a list of identifiers stored in the enclosure memory 48. Although the mechanism 49A-D is shown in the servers 24A-D, it should be understood that the mechanism may be included in the HBAs 42A-H, and/or the enclosure 44. For example, one possibility for the mechanism 49A-D may include a DOS or a Windows utility program that is run on the particular server to access the enclosure memory 48 and retrieve the assigned identifier when the server is placed in a slot of the enclosure 44. Implementation of the utility program would limit user intervention to simply managing the list of identifiers and the user would not have to manually visit each server to attach the servers to the SAN 16.

Figure 4:
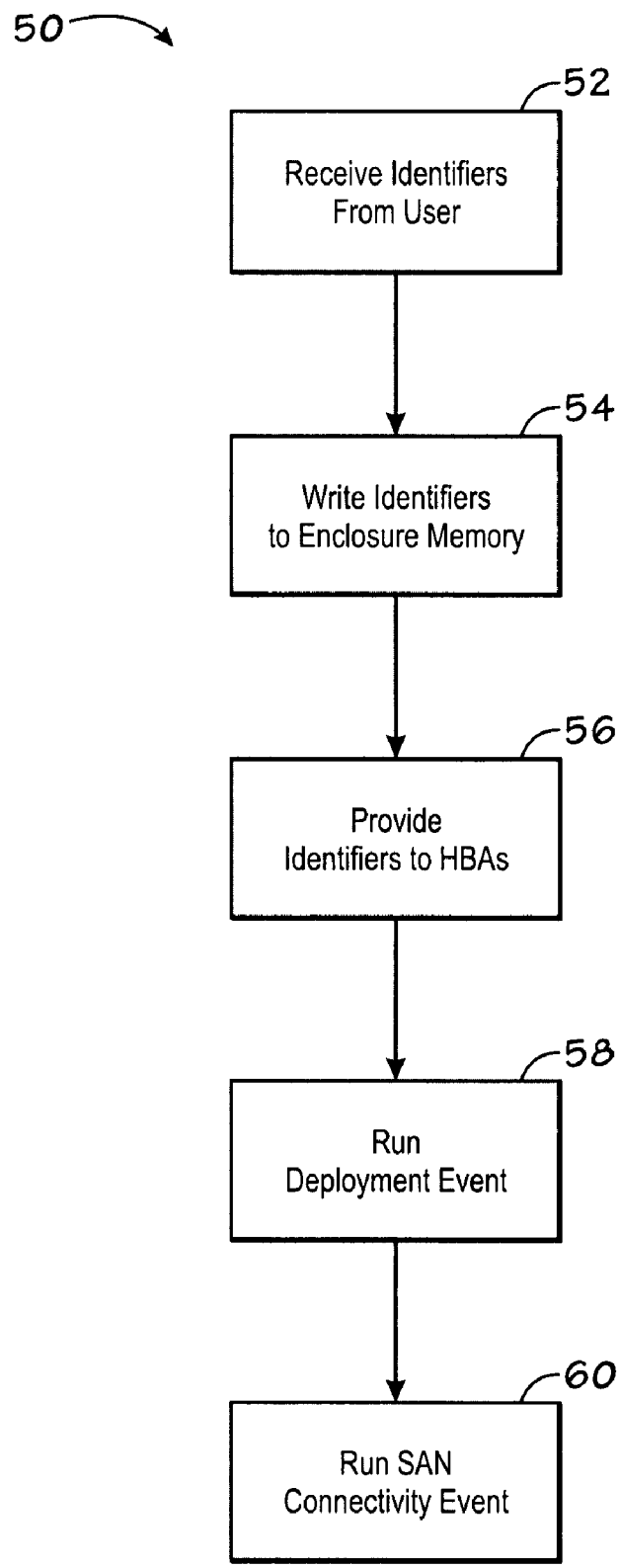
FIG. 4 illustrates a flow chart of a technique for providing identifiers to an enclosure and providing SAN connectivity.

Alternatively, the enclosure 44 may be configured to allow a user to use a console (not shown) communicatively coupled to the enclosure 44 to enter a list of identifiers and assign them to particular bays or slots. FIG. 4 illustrates a flow chart of a technique for providing identifiers to the enclosure 44 and providing SAN connectivity. The technique 50 begins by the enclosure 44 receiving identifiers from a user as indicated at block 52. The identifiers are written to enclosure memory 48 as indicated at block 54. Deployment agents, such as DOS, Windows, etc, would have the ability to write the list into the enclosure memory 48. Upon installation of a server 24A-D into a bay, the identifiers may be provided to the HBAs 42A-H of the server. Once the identifiers are stored at the enclosure memory 48, the identifiers are provided to the servers 24A-D according to their specific location or particular bay, as indicated at block 56.

The basic process to achieve SAN connectivity and SAN boot capability may also include running a deployment event, as indicated at block 58. The deployment event may be either a scripted install event or an image deploy event, for example. A scripted install event includes configuring the hardware, installing the OS and installing a software support pack which contains drivers for the SAN. An image deploy event may include configuring the hardware and imaging a hard drive of the server. The image contains the SAN drivers and does not need to contain the multipathing or SAN drive mappings. Additionally, the process includes allocating, partitioning and formatting a volume at the appropriate SAN entities.

Subsequently, a SAN connectivity event is run for the servers 24A-D and a server-to-server protocol (SSP) and zones are configured, as indicated at block 60. The SAN connectivity event will install appropriate software on the servers 24A-D, store the identifiers for future use, and map drives to the SAN partitions. The SAN connectivity event may be in template form, meaning a user may modify it to fit any particular SAN environment. Specifically, in order to use the SAN connectivity event, the user may need to copy, rename and edit each event for every instance of that type in their environment. For example, if the system has ten event and alarm handling applications (EVAs) and uses both Windows and Linux, the user will need to make 20 copies of the EVA event, ten for Windows and ten for Linux, and modify each one with the address of each EVA. After the deployment event and SAN connectivity events have occurred, the server 24A-D is able to access the SAN 16 and may be configured to boot from the SAN 16.

When a server is replaced, the server 24 to be replaced is removed from the bay and a new server is placed in the bay. The user may set a "server change" rule specifying whether the replacement server attachment to the SAN 16 should be automated. If a "server change" rule for the bay is configured to redeploy the server automatically, the above deployment event and SAN connectivity event will be re-executed for the replacement server. If the "server change" rule is not set, the user may implement the associated redeploy events manually.

Figure 5:
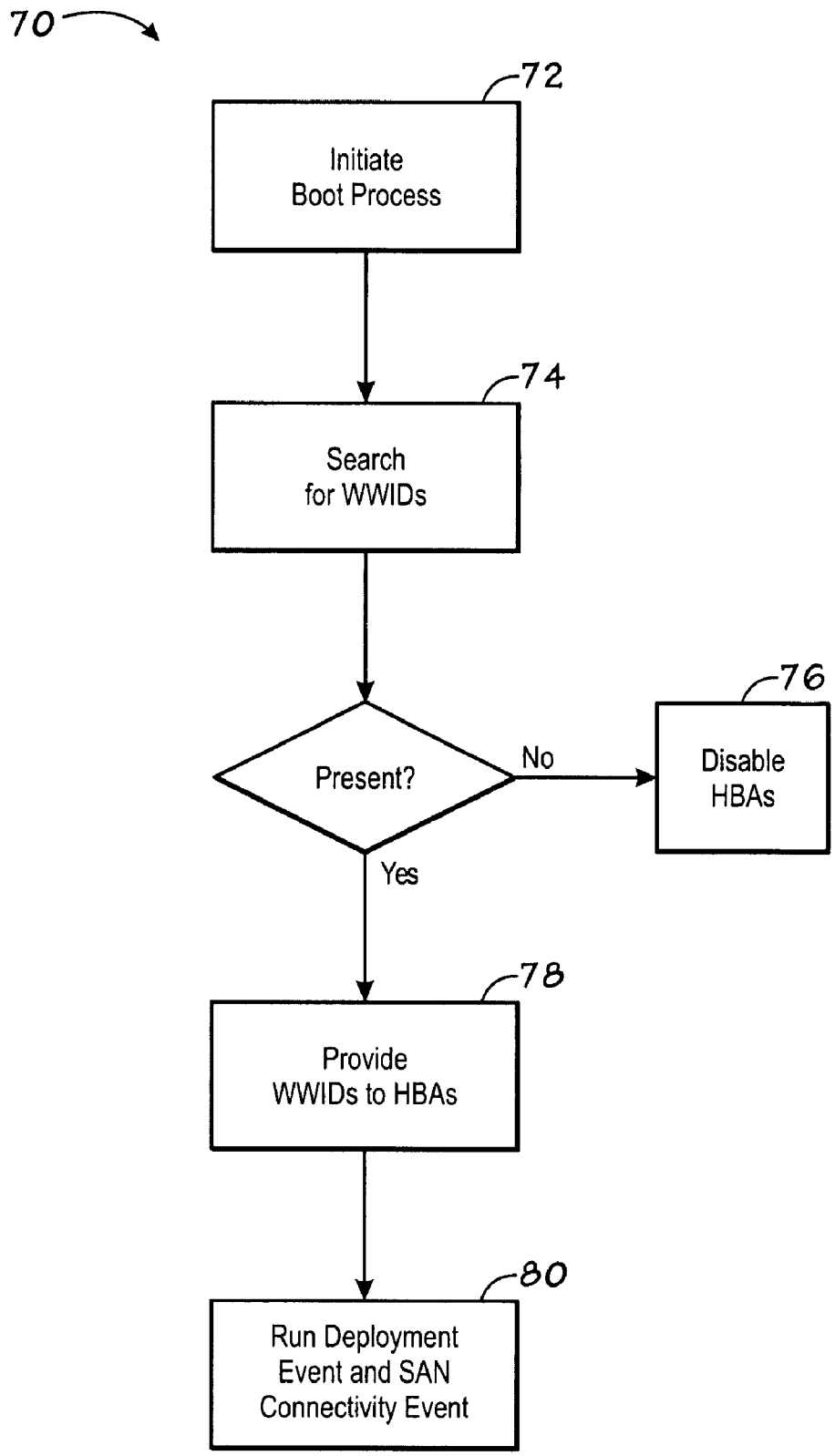
FIG. 5 illustrates a flow chart of a technique for replacement of a server.

As part of the boot process for a replacement server, server system firmware may be configured to look for the identifiers in the enclosure memory 48. FIG. 5 illustrates a flow chart of a SAN boot technique 70 wherein an identifier, such as a WWID or WWN, is provided to a HBA 42A-H based on the location of the HBA 42A-H. The technique 70 begins when a boot process is initiated, and the firmware for the server 24 searches for an identifier on the enclosure memory 48, as indicated at blocks 72 and 74. If no identifier is found for the particular bay or slot of the enclosure 44, the HBA 42A-H is disabled as indicated at block 76. Alternatively, if an identifier is found, the identifier is provided to the HBA 42A-H as indicated at block 78. Once the identifier is written to the HBA 42A-H, the boot process continues by running the deployment event and the SAN connectivity event, thus, installing an operating system, installing SAN software, and mapping drives to the partition, as indicated at block 80. Because the server 24 is replacing another server, all events starting with the last deployment type event are replayed. Since the identifiers are handled prior to the events getting replayed, the new server operates within the system just as the replaced server did previously. Thus, the attachment to the SAN 16 is automated and does not require a user or network manager to load or configure the HBAs 42A-H, servers 24A-D, or switches 40A-B with an identifier in order for the server 24 to attach or boot from the SAN 16.

Because the HBAs 42A-H may come from different manufacturers and may require unique manufacturer driver support for operation, the support package may be configured to provide a variety of drivers so that a variety of manufacturer's HBA 42A-H will be supported and operate properly when the new server is installed. For example, an Emulex HBA driver may be required for an Emulex HBA, while a QLogic HBA driver may be required for a QLogic HBA. Drivers for both the Emulex and the QLogic may be provided for by the support package. Furthermore, the drivers may be configured to operate in a mode to multipath any HBAs that are preconfigured to utilize a fiber channel utility. Thus, the options may be changed after installation to suit any particular SAN configuration.

In addition to the steps set forth above, other software may be useful for achieving SAN connectivity. For example, a multipathing product that that manages multiple paths to support storage devices from a host may be provided. The multipathing software can be run silently and non-interactively using an is file. Optionally, the multipath software may be configured to include password protection set through a local configuration utility, and a client list which lists machine names. Additionally, load balancing, path verification, and auto fallback can be turned on or off as set by a user through an agent.

Additionally, in an alternative embodiment, SAN utilities may be implemented to make SAN events operate. Specifically, an identifier rename utility for various configurations may be implemented to rename the identifiers in the SSP. The rename utility reads old identifiers (WWIDs) from enclosure memory, reads new identifiers (WWIDs) from the HBAs, and if the old identifiers are the same as the new identifiers, then it exits for each old identifier and tells the appliance to rename the old to the new. An identifier save utility may be used to store the current identifiers into the enclosure memory 48 for future replacement of the server. The save utility reads identifiers from the HBAs and writes the identifiers to the enclosure memory 48. Additionally, the SAN connectivity event will also tell the appropriate SAN entity to correct the server-to-server protocol (SSP) associations for the new identifiers.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for automating attachment of a server to a storage area network (SAN) comprising:
   storing identifiers in a memory associated with an enclosure adapted to house one or more servers, wherein the identifiers are correlated to a particular location of the enclosure; and
   providing the identifiers from the memory to host bus adapters (HBAs) associated with the particular location when a server is placed in the particular location,
   wherein each server is configured to search for the identifiers, and
   wherein each server is configured to disable the HBAs associated with the particular location of the enclosure if the server is unable to find the identifiers.

2. The method of claim 1 wherein the identifiers comprise a world wide identifier (WWID) or a world wide name (WWN).

3. The method of claim 1, wherein each server is configured to write the appropriate identifier to the HBAs associated with the particular location at which the server has been placed.

4. The method of claim 1, wherein each server is configured to initiate deployment events and SAN connectivity events to allow the server to attach to the SAN.

5. The method of claim 1, wherein each server is configured to boot from a storage device accessed via the SAN.

6. A storage area network (SAN) comprising:
   a SAN fabric;
   one or more storage devices coupled to the SAN fabric; and
   an enclosure housing the SAN fabric and the one or more storage devices, the enclosure comprising an enclosure memory configured to store identifiers for servers placed in the enclosure,
   wherein each server placed in the enclosure is configured to search for the identifiers, and
   wherein each server placed in the enclosure is configured to disable the HBAs associated with the particular location of the enclosure if the server is unable to find the identifiers.

7. The SAN of claim 6 wherein the enclosure comprises slots, the identifiers stored in the enclosure memory being associated with particular slots and the slots being configured to communicatively couple servers to the SAN.

8. The SAN of claim 7 wherein the enclosure memory is configured to provide the identifiers to host bus adapters associated with servers installed in the slots of the enclosure.

9. The SAN of claim 6 wherein the enclosure memory is a read only memory, programmable read only memory, erasable and programmable read only memory, electrically erasable and programmable read only memory or Flash memory.

10. The SAN of claim 6, wherein the enclosure memory is associated with a backplane or midplane of the enclosure.

11. The SAN of claim 6 wherein the SAN fabric is a fibre channel fabric.

12. The SAN of claim 6 wherein the one or more storage devices comprises one or more of the following types of storage devices, in any combination:
    a tape drive;
    a hard disk drive;
    an optical drive; and
    a semiconductor device.

13. The SAN of claim 7 wherein the one or more storage devices are located on one or more blades configured to fit into the slots of the enclosure.

14. The SAN of claim 7 wherein the SAN fabric is located on one or more blades configured to fit into the slots of the enclosure.

15. A method for configuring a system to automatically attach a replacement server to a storage area network, the method comprising:
    receiving identifiers from a user, each identifier being associated with a slot of an enclosure;
    writing the identifiers to an enclosure memory; and
    providing an associated identifier to host bus adapters (HBAs) of a server when the server is placed into the slot associated with the identifier,
    wherein the server is configured to search for the identifiers, and
    wherein the server is configured to disable the HBAs associated with the particular location of the enclosure if the server is unable to find the identifiers.

16. The method of claim 15 comprising:
    running a deployment event for the server; and
    running a SAN connectivity event for the server.

17. The method of claim 15 wherein providing an associated identifier to HBAs comprises responding to a read request from firmware of the server.

18. The method of claim 15 wherein writing identifiers to an enclosure memory comprises writing world wide identifiers to the enclosure memory.

* * * * *